Nov. 28, 1961  E. KOCHJOHANN  3,010,144
SKIN TWISTING DEVICE FOR SAUSAGE FILLING MACHINES
Filed July 1, 1959

INVENTOR
Ernst Kochjohann
BY
Richards & Geier
ATTORNEYS

3,010,144
SKIN TWISTING DEVICE FOR SAUSAGE FILLING MACHINES

Ernst Kochjohann, 4 Intze Strasse, Remschied, Germany
Filed July 1, 1959, Ser. No. 824,298
Claims priority, application Germany July 7, 1958
4 Claims. (Cl. 17—34)

This invention relates to a skin twisting device for sausage filling machines, and refers more particularly to a device for automatically twisting off the ends of the sausages which emerge from a sausage filling machine.

An object of the present invention is the provision of a device of the described type which is simple in construction and most effective in operation.

Other objects of the present invention will be apparent in the course of the following specification.

The twisting device constituting the subject of the present invention is connected with a filling section of a sausage making machine. The device comprises a container for an elongated sausage skin, which consists of a synthetic material, and which is located in the fold within the container. The sausage skin can easily and conveniently lie out of the container during the filling of the sausage, but it is held firmly during the twisting off operation.

The objects of the present invention may be realized through the provision of a clamping device which at the completion of the filling of a sausage, closes automatically around the sausage skin and holds it firmly during the twisting off operation. After the completion of the twisting off operation, the clamping device opens automatically again and releases the sausage skin for the filling of the next sausage.

In accomplishing the objects of the present invention, the device may include a filling tube which is enclosed concentrically by a tubular casing, and the tube and the casing can be provided with clamping elements. By way of example, the filling tube may be provided with a conical end piece and the casing may be provided with a nozzle enclosing the end piece, and having the shape of a cone extending in the opposite direction to the end piece. The nozzle is connected with the casing and is reciprocable longitudinally relatively to the casing. This longitudinal movement is carried out automatically, for example, by the use of an inclined guide slot and by the inertia of the nozzle, so that it is shiftable into a clamping position and into an inoperative open position. The casing is preferably so constructed that it can be easily and conveniently opened. The parts which are used for the opening operation are preferably interconnected by a magnetic holding device, so as to facilitate a quick and easy closing and opening of the device. Furthermore, the filling tube is removably mounted in the casing.

The invention will appear more clearly from the following detailed description taken in connection with the accompanying drawing, showing by way of example a preferred embodiment of the inventive idea.

Figure 1:
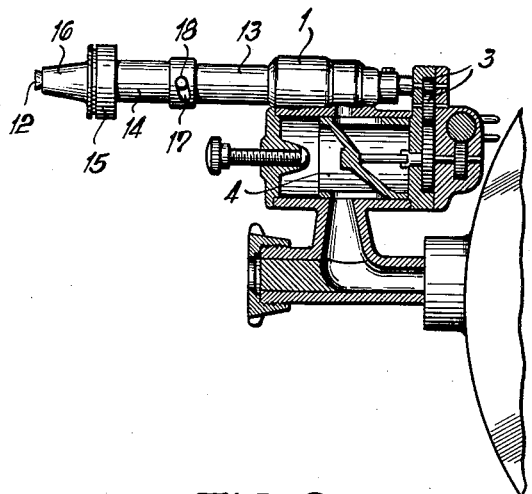
FIGURE 1 shows partly a side view and partly in section the arrangement of the device of the present invention upon a sausage filling machine.

The sausage filling machine, a part of which is illustrated in the drawing, comprises a casing portion 1 containing a hollow shaft 2. The shaft 2 is driven by gears 3 which are actuated by the drive of the filling device 4, which is illustrated diagrammatically in the drawing. The interior 5 of the hollow shaft 2 communicates with openings 6, which are provided in the shaft and which are in communication with the passage 7 for the sausage filling leaving the chamber 4.

The front end of the shaft 2 is provided with screw threads 8 which hold the filling tube 9. Thus, the filling tube 9 is firmly fitted into the shaft 2 and is rotatable therewith.

A sausage skin 10 is arranged in folds upon the outer surface of the filling tube 9. The tube 9 has an outer opening 11a through which the sausage filling passes before it is enclosed by the sausage skin 10. The outer open end 11 of the tube 9 carries an end piece 12, consisting of a cone made preferably of rubber, and removably mounted upon the end of the filling tube 9.

A casing 13 encloses concentrically the tube 9 and is spaced therefrom. The inner end 13a of the casing 13 is firmly connected with the adjacent inner end 9a of the tube 9, so that it will rotate jointly with the tube 9. The outer open end 13b of the casing 13 which is adjacent to the end 11 of the tube 9 and spaced therefrom carries a sleeve 14 which supports a magnetic holding device 15. The holding device 15 is used to hold the nozzle 16, which encloses the end piece 12 and which has the shape of a cone, extending in the opposite direction from that of the conical end piece 12. The end piece 12 and the inner surfaces of the nozzle 16, as well as the outer surfaces of the tube 9 constitute clamping means for holding the sausage skin.

The casing 13 carries a pin 18 which is located in a slot 17 formed in the sleeve 14 and extending at an acute angle to the longitudinal axis of the sleeve 14.

Figure 2:
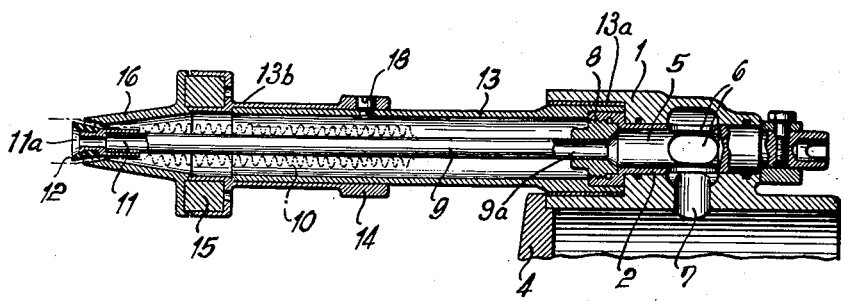
FIGURE 2 is a longitudinal section through the device on a larger scale.

The operation of the device is as follows:

In the beginning of the operation the parts are located in the position shown in FIGURES 1 and 2.

When the drive is actuated and the tube 9 begins to rotate counterclockwise (as viewed from the right side of FIGURE 1) along with the casing 13, the sleeve 14 will not rotate for a moment due to the force of inertia in the initial stage of the rotation. Then the pin 18 will reach the lower edge of the slot 17 (looking in the direction of FIG. 1) and at that time the sleeve 14 will be shifted forward, namely, to the left. Then the inner cone of the conical nozzle 16 will be shifted over the outer cone of the conical end piece 12, so that the sausage skin 10 will be clamped between the end piece 12 and the nozzle 16 and will be rotated during the twisting operation. Prior to this operation, a sausage was filled by the filling which was moved from the compartment 4 through the passage 7, the opening 6 and the interior of the filling tube 9. This filled sausage is located beyond the end piece 12. The rotating container formed by the tube 9 and the casing 13 will twist off the portion of the skin located immediately beyond the end piece 12 with the result that the sausage will be completed. As soon as the twisting off operation is at an end, the casing 13 and the tube 9 will stop suddenly. This stoppage takes place by means of a driving mechanism which does not constitute a part of the present invention and is not shown in the drawing. Then as the result of the forces of inertia, the sleeve 14 will continue to rotate until it is moved back to the position shown in FIG. 1. Then the nozzle 16 will be shifted to the rear and will thus free the sausage skin.

During the next filling operation, the filling will engage the skin and push out a portion of the skin to form another sausage which will hang at the outer end of the end piece 12. Then, the twisting off operation will be carried out again. Since this intermittently carried out operation of forming the sausage does not constitute a part of the present invention, it is illustrated only diagrammatically in the drawing.

An important advantage of the device constructed in accordance with the present invention is the automatic operation of the clamping means. Furthermore, it is apparent that due to the provision of the magnetic holding device 15, and due to the removable mounting of the tube 9, the device can be conveniently taken apart whenever necessary for cleaning purposes.

It is apparent that the example shown above has been given solely by way of illustration and not by way of limitation, and that it is subject to many variations and modifications within the scope of the present invention. All such variations and modifications are to be included within the scope of the present invention.

What is claimed is:

1. A skin twisting device for sausage filling machines, said device comprising a filling tube, an elongated casing concentrically enclosing said tube and spaced therefrom to form a container for a sausage skin, said tube and said casing having two interconnected inner adjacent ends, means connected with said tube for intermittently rotating said tube and said casing, said tube and said casing having two outer adjacent spaced open ends for the emergence of said sausage skin, a conical end piece carried by said outer open end of the filling tube and rotatable therewith, a conical nozzle enclosing said conical end piece and diverging in opposite direction thereto, said conical end piece diverging outwardly relatively to said outer open end and said conical nozzle converging relatively to said conical end piece, and means connected with said nozzle and supporting it upon said casing for rotation along with said casing and for longitudinal reciprocal movements relatively thereto, whereby said nozzle is movable in and out of a clamping engagement with said end piece.

2. A skin twisting device for sausage filling machines, said device comprising a filling tube, an elongated casing concentrically enclosing said tube and spaced therefrom to form a container for a sausage skin, said tube and said casing having two interconnected inner adjacent ends, means connected with said tube for intermittently rotating said tube and said casing, said tube and said casing having two outer adjacent spaced open ends for the emergence of said sausage skin, a conical end piece carried by said outer open end of the filling tube and rotatable therewith, a conical nozzle enclosing said conical end piece and diverging in opposite direction thereto, said conical end piece diverging outwardly relatively to said outer open end and said conical nozzle converging relatively to said conical end piece, and a sleeve integral with said nozzle and mounted upon said outer open end of the casing for rotation therewith and for longitudinal reciprocal movements relatively thereto, whereby said nozzle is movable in and out of a clamping engagement with said end piece.

3. A skin twisting device for sausage filling machines, said device comprising a filling tube, an elongated casing concentrically enclosing said tube and spaced therefrom to form a container for a sausage skin, said tube and said casing having two interconnected inner adjacent ends, means connected with said tube for intermittently rotating said tube and said casing, said tube and said casing having two outer adjacent spaced open ends for the emergence of said sausage skin, a conical end piece carried by said outer open end of the filling tube and rotatable therewith, a conical nozzle enclosing said conical end piece and diverging in opposite direction thereto, said conical end piece diverging outwardly relatively to said outer open end and said conical nozzle converging relatively to said conical end piece, a sleeve integral with said nozzle and mounted upon said outer open end of the casing, said sleeve having an inclined elongated slot formed therein, and a pin carried by said casing and engaging said slot to cause said sleeve and nozzle by inertia to move longitudinally upon said casing and clamp said sausage skin during the beginning of the rotary movement of said casing, said nozzle withdrawing from said end piece after the twisting off of a sausage end.

4. A skin twisting device for sausage filling machines, said device comprising a filling tube, an elongated casing concentrically enclosing said tube and spaced therefrom to form a container for a sausage skin, said casing having an inner end portion and an outer open end portion, magnetic means interconnecting said two casing portions, said tube having an inner end adjacent the inner end of said casing and an outer open end adjacent the outer end of said casing, means connecting said inner end portion of the casing with said inner end of the tube, means connected with said tube for intermittently rotating said tube and said casing, said outer ends of the tube and casing being spaced for the emergence of said sausage skin, and clamping means carried by said outer ends of the tube and the casing for automatically holding said sausage skin to cause the twisting off of a sausage end.

References Cited in the file of this patent

UNITED STATES PATENTS 1,292,645    Reisfeld _____ Jan. 28, 1919